US006961565B2

(12) United States Patent
Tanno et al.

(10) Patent No.: US 6,961,565 B2
(45) Date of Patent: Nov. 1, 2005

(54) CELL SEARCH METHOD AND APPARATUS FOR MOBILE STATION IN MOBILE COMMUNICATION SYSTEM

(75) Inventors: Motohiro Tanno, Kanagawa (JP); Takehiro Nakamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 407 days.

(21) Appl. No.: 09/954,956

(22) Filed: Sep. 18, 2001

(65) Prior Publication Data

US 2002/0034944 A1 Mar. 21, 2002

(30) Foreign Application Priority Data

Sep. 18, 2000 (JP) ........................................ 2000-281971

(51) Int. Cl.[7] .............................................. H04Q 7/20
(52) U.S. Cl. ........................ 455/434; 455/412; 455/414; 455/415; 455/417; 455/432.1; 455/432.3; 455/435.2; 455/452.1
(58) Field of Search ........................... 455/452.1, 435.2, 455/432.1, 432.3, 434, 412, 414, 415, 417; 375/149, 150, 152, 140, 141, 145, 146; 370/342, 344, 345, 329, 335

(56) References Cited

U.S. PATENT DOCUMENTS 5,930,366 A * 7/1999 Jamal et al. ................ 370/509

| 6,185,244 | B1 | * | 2/2001 | Nystrom et al. | ............ 375/145 |
| 6,363,060 | B1 | * | 3/2002 | Sarkar | ........................ 370/342 |
| 6,556,620 | B1 | * | 4/2003 | Ohnishi | ...................... 375/149 |
| 6,754,251 | B1 | * | 6/2004 | Sriram et al. | ............... 375/145 |
| 2002/0003791 | A1 | * | 1/2002 | Hayata | |

FOREIGN PATENT DOCUMENTS

| EP | 0825737 A1 | 2/1998 | ............ H04J/13/00 |
| EP | 0930723 A2 | 7/1999 | ........... H04B/1/707 |

* cited by examiner

*Primary Examiner*—Allan Hoosain
(74) *Attorney, Agent, or Firm*—Workman Nydegger

(57) ABSTRACT

The present invention reduces the time required for cell search and increase the accuracy of the cell search by determining, during selection of frame boundaries and a scramble code, whether or not the selection results are correct. A mobile station causes descramblers to descramble a received signal with eight scramble codes. Then, correlators calculate the phases of the scramble codes on the basis of frame boundaries, and despreads the signal with a spreading code for a CPICH. The mobile station performs this operation over a plurality of symbols, and causes averaging process sections to average the results. Then, a peak detector selects a scramble code with which an average correlation coefficient is largest. This maximum average correlation coefficient is output to a detection results judging section, which then calculates the ratio of this value to a reference value calculated inside the mobile station, thereby judging detection results.

10 Claims, 12 Drawing Sheets

CELL SEARCH METHOD AND APPARATUS FOR MOBILE STATION IN MOBILE COMMUNICATION SYSTEM

This application claims priority under 35 U.S.C. 119 to patent application No. 2000-281971 filed Sep. 18, 2000 in Japan, the content of which is incorporated hereinto by reference.

BACKGROUND OF THE INVENTION

1. Field of the Invention

The present invention relates to a cell search method and apparatus for a mobile station in a mobile communication system.

2. Description of the Related Art

In a mobile communication system based on the CDMA (Code Division Multiple Access) method, if a mobile station communicates with a base station or measures power received from a base station, it must detect frame boundaries and a scramble code in a down signal from the base station. This is called "cell search".

The cell search method essentially comprises descrambling the signal at all possible scramble codes with all possible timings and selecting a timing and a scramble code with which a correlation coefficient obtained as a result of despreading with spreading code used is largest, thereby detecting frame boundaries and the scramble code for the base station. This method, however, requires a large amount of time for the cell search. To increase the speed of the cell search, a method in which the base station transmits each slot through a PSCH (Primary Synchronization CHannel) and an SSCH (Secondary Synchronization CHannel) is used (refer to 3GPP Technical Specification 25.211).

FIG. 1 shows a configuration of a down channel relating to the cell search. This down channel relates to the cell search in the W-CDMA method (refer to 3GPP Technical Specification 25.211), which is representative of the CDMA method. On a primary synchronization channel, a spreading code PSC (Primary Synchronization Code) is used, which is common to all cells and slots, and the signals is transmitted in accordance with slot cycles. On a secondary synchronization channel, different spreading codes $SSC_0$ to $SSC_{n-1}$ (Secondary Synchronization Codes) are used for the respective slots, one frame constitutes a spreading code sequence, and is repeatedly and cyclically transmitted. Different spreading code sequences are used for respective cells, and are each correlated with a scramble code group to which the scramble code used by the base station belongs. The primary and secondary synchronization channels are not subjected to scramble codes. On a common pilot channel (CPICH), the signals is transmitted by using a spreading code and a symbol pattern which are common to all the cells and subjecting the respective cells to different scramble codes.

FIG. 2 shows a first step operation performed in a conventional cell search method. On the primary synchronization channel, the spreading code PSC, which is common to all the cell and slots, is used. A mobile station inputs a received signal to a matched filter 201 corresponding to this spreading code PSC, and causes an multi-slot averaging process section 202 to execute averaging over a plurality of slots in order to reduce the adverse effects of noise and interference. A peak detector 203 selects a timing with which an average correlation coefficient is largest, to detect slot boundaries. In the W-CDMA method, one slot corresponds to 2,560 chips, so that there are 2,560 candidate timings for the slot boundaries if no oversampling is executed. The above described operation is called a "first step".

On the secondary synchronization channel, the different spreading codes are used for the respective slots, and one frame constitutes a spreading code sequence. The spreading code sequence is repeated in accordance with frame cycles, and different spreading code sequences are used for the respective cells. These spreading code sequences are correlated with respective groups of scramble codes so as to allow the scramble codes to be subsequently detected easily. Since the slot boundaries have been detected at the first step, the mobile station can calculate a transmission timing on the secondary synchronization channel.

The mobile station then despreads a received signal using the calculated timing and the spreading codes SSC for the secondary synchronization channel, averages correlation output coefficients corresponding to all possible frame boundaries and SSC sequences, and selects a timing and an SSC spreading code sequence with which the average correlation coefficient is largest. The mobile station thus detects the frame boundaries and a scramble code group. This operation is called a "second step".

FIG. 3 shows a second step operation performed in the conventional cell search method. A timing with which transmissions are executed on the secondary synchronization channel are calculated on the basis of the slot boundaries detected at the first step. Correlators $301_1$ to $301_{16}$ corresponding to the secondary synchronization codes detect a correlation using the calculated timing. The W-CDMA method involves 16 secondary synchronization codes. Thus, the correlation operation is performed over a plurality of slots. Since the secondary synchronization code pattern is repeated on the secondary synchronization channel so as to correspond to the frame cycles, averaging process sections $302_1$ to $302_{16}$ execute an averaging process over the frames as required. In the W-CDMA method, a maximum of 16 secondary synchronization codes are used for each slot to achieve the correlation, and one frame consists of 15 slots. Accordingly, after the inter-frame averaging, a maximum of 16×15 average correlation coefficients are output and stored in a correlation value memory 304. Subsequently, a $C2_{k1}$ calculating section 305 averages the correlation coefficients so as to correspond to timings and SSC spreading code sequences that are possible within the frame. In the W-CDMA method, if the slot boundaries are known, 15 timings are possible for the frame boundaries and there are 64 possible SSC sequences, so that a maximum of 15×64 average correlation coefficients are calculated. As a result, a peak detector 303 detects frame boundaries and a scramble code group by selecting a timing and an SSC spreading code sequence with which the average correlation coefficient is largest.

The mobile station, which has detected the frame boundaries and the scramble code group during the second step, finally receives a signal subjected to a scramble code, through a common pilot channel, and determines which of the scramble codes of the scramble code group equals that of this signal. Since the frame boundaries have already been detected, the phase of the scramble code can be calculated. Since the spreading code for the common pilot channel is common to all the cells, essentially all the scramble codes within the group may be used to descramble the signal, and the spreading code for the common pilot channel may then used to despread the signal. Subsequently, these operations may be performed over a plurality of symbols with the results averaged, and a scramble code may then be selected with which the average correlation coefficient is largest. This operation is called a "third step".

FIG. 4 shows a third step operation performed in the conventional cell search method. For example, in the W-CDMA method, one scramble code group contains eight scramble codes. The mobile station calculates the phases of scramble codes on the basis of the frame boundaries detected during the first and second steps, and causes descramblers $404_1$ to $404_8$ to descramble the received signal with eight scramble codes. Then, correlators $401_1$ to $401_8$ calculate the phases of the scramble codes on the basis of the frame boundaries detected at the second step, and despreads the signal using the spreading code for the common pilot signal. The mobile station performs this operation over a plurality of symbols, and causes averaging process sections $402_1$ to $402_8$ to average the results. A peak detector 403 then selects a scramble code with which the average correlation coefficient is largest, to detect a down scramble code used by the base station.

FIG. 5 shows a conventional method of judging the detected frame boundaries and scramble code. If the first to third steps are defined as one search, then after one search has been completed, the mobile station causes a descrambler 504 to descramble the received signal on the basis of the detected frame boundaries and scramble code. Then, a correlator 501 despreads the signal with the spreading code for the common pilot channel, and a pilot symbol demodulating and error measuring section 502 demodulates a pilot symbol on the common pilot channel and measures the number of errors in the pilot symbol. A detection result judging section 503 then executes threshold judgements or the like to determine whether or not the correct frame boundaries and scramble code have been detected.

For example, if a control signal from the base station provides the mobile station with information on scramble codes and frame boundaries for surrounding cells or the mobile station has information on scramble codes and frame boundaries for surrounding cells immediately after the last search, the above described three-step search method may be omitted. That is, the cell search can be achieved by assuming a plurality of frame boundaries before and after an expected frame boundary, descrambling the signal with a candidate scramble code in accordance with respective timings, despreading the signal with the spreading code for the common pilot channel, and then selecting frame boundaries and a scramble code with which the average correlation coefficient is largest.

With this method, the cell search can be simplified to reduce search time and power consumption compared to the three-step cell search. Even in this method, after the frame boundaries and scramble code providing the largest average correlation coefficient have been selected, whether or not these frame boundaries and scramble code are correct is determined by descrambling and despreading the received signal again on the basis of the detected frame boundaries and scramble code, decoding the pilot symbol, and measuring the number of errors in this symbol, or using other methods.

The shorter the cell search time of the mobile station is, the lower its power consumption is. Further, handover can be executed at a high speed, thereby enabling smooth communication. Accordingly, that the time required to determine whether the detected frame boundaries and scramble code are correct is desirably short, and this judgement is desirably accurate enough to avoid selecting incorrect frame boundaries or scramble code or unnecessarily repeating the cell search.

With the conventional method, however, after the frame boundaries and the scramble code have been selected, these detection results are judged again, thus requiring correspondingly much time for the cell search. Another problem with this method is that the judgement is not sufficiently accurate if the signal noise interference power ratio is small.

SUMMARY OF THE INVENTION

It is an object of the present invention to reduce the time required for the cell search, increase the accuracy of the cell search, reduce the power consumption of a mobile station, and provide smooth and stable communications by determining, during selection of frame boundaries and a scramble code, whether or not the selection results are correct, and achieving this judgement more accurately than in the prior art.

To attain this object, the present invention provides a cell search method for a mobile station in a mobile communication system, the method comprising a first step of despreading a received signal using a common spreading code common to all slots and detecting slot boundaries on the basis of a first average correlation coefficient, a second step of despreading the signal on the basis of the slot boundaries detected at the first step, using different individual spreading codes for the respective slots, and detecting frame boundaries and a scramble code group on the basis of a second average correlation coefficient, and a third step of descrambling a common pilot signal on the basis of the frame boundaries and scramble code group detected at the second step, and detecting a scramble code on the basis of a third average correlation coefficient, the method being characterized in that the detection results for the frame boundaries and scramble code are judged on the basis of a ratio of the largest one of a plurality of third average correlation coefficients to a predetermined reference value.

With this method, the detection results can be judged simultaneously with the operation at the third step, thereby reducing the time required for the cell search and the judgement of the detection results.

The reference value can be set on the basis of interference power calculated from the signal received by the mobile station. Since the mobile station based on the W-CDMA method has a function of measuring down interference power, this function can be used to calculate the interference power.

Further, the reference value can be set on the basis of the plurality of third average correlation coefficients except the largest one thereof. This method eliminates the need to measure the interference power and enables an interference power-equivalent value to be calculated substantially simultaneously with the calculation of the maximum average correlation coefficient.

Furthermore, the reference value may be an average or a median of the plurality of third average correlation coefficients except the largest one thereof. This method eliminates the need to measure the interference power and enables an interference power-equivalent value to be calculated substantially simultaneously with the calculation of the maximum average correlation coefficient.

Moreover, the reference value can be set on the basis of a plurality of second average correlation coefficients except the largest one thereof. With this method, if information on scramble codes for surrounding cells has been obtained from control information or the like from the base station and the average correlation coefficient is found for only one scramble code at the third step, then the reference value can be determined at the second step.

Furthermore, the reference value may be an average or a median of the plurality of second average correlation coefficients except the largest one thereof. With this method, if information on scramble codes for surrounding cells has been obtained from control information or the like from the base station and the average correlation coefficient is found for only one scramble code at the third step, then the reference value can be determined at the second step.

Moreover, the reference value can be set on the basis of a plurality of first average correlation coefficients. With this method, if information on frame boundaries or scramble codes and for surrounding cells has been obtained from control information or the like from the base station and the second step is skipped or the average correlation coefficient is found for only one scramble code at the third step, then the reference value can be determined at the first step.

Furthermore, the reference value may be an average or a median of an arbitrary number of first average correlation coefficients selected from the plurality of first average correlation coefficients in the ascending order of the value. With this method, if information on frame boundaries or scramble codes for surrounding cells has been obtained from control information or the like from the base station and the second step is skipped or the average correlation coefficient is found for only one scramble code at the third step, then the reference value can be determined at the first step.

Further, the present invention provides a cell search method for a mobile station in a mobile communication system, the method descrambling a common pilot signal on the basis of information on known scramble codes and frame boundaries, and detecting a scramble code on the basis of an average correlation coefficient, the method being characterized in that detection results for the frame boundaries and scramble code are judged on the basis of a ratio of the largest one of a plurality of average correlation coefficients to a predetermined reference value.

With this method, the detection results can be judged simultaneously with the operation at the third step, thereby reducing the time required for the cell search and the judgement of the detection results.

The reference value can be set on the basis of interference power calculated from a signal received by the mobile station. Since the mobile station based on the W-CDMA method has a function of measuring down interference power, this function can be used to calculate the interference power.

Further, the reference value can be set on the basis of the plurality of average correlation coefficients except the largest one thereof. This method eliminates the need to measure the interference power and enables an interference power-equivalent value to be calculated substantially simultaneously with the calculation of the maximum average correlation coefficient.

Furthermore, the reference value may be an average or a median of the plurality of average correlation coefficients except the largest one thereof. This method eliminates the need to measure the interference power and enables an interference power-equivalent value to be calculated substantially simultaneously with the calculation of the maximum average correlation coefficient.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
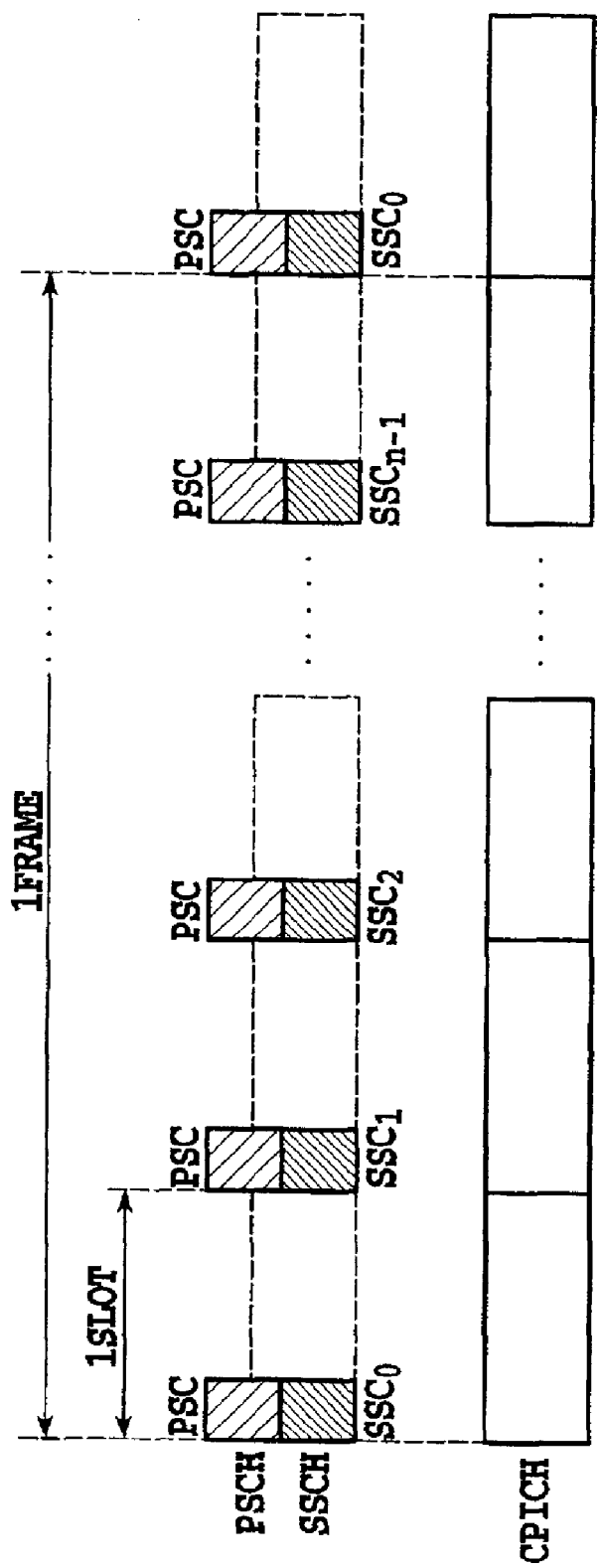
FIG. 1 is a schematic diagram showing a configuration of a down channel relating to cell search.
Figure 2:
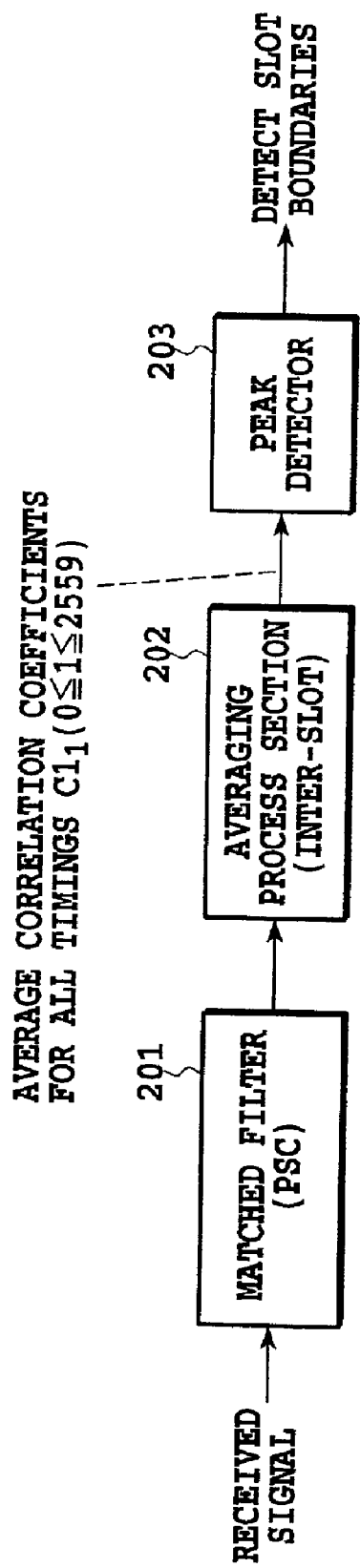
FIG. 2 is a diagram for use in describing an operation at a first step of a conventional cell search method.
Figure 3:
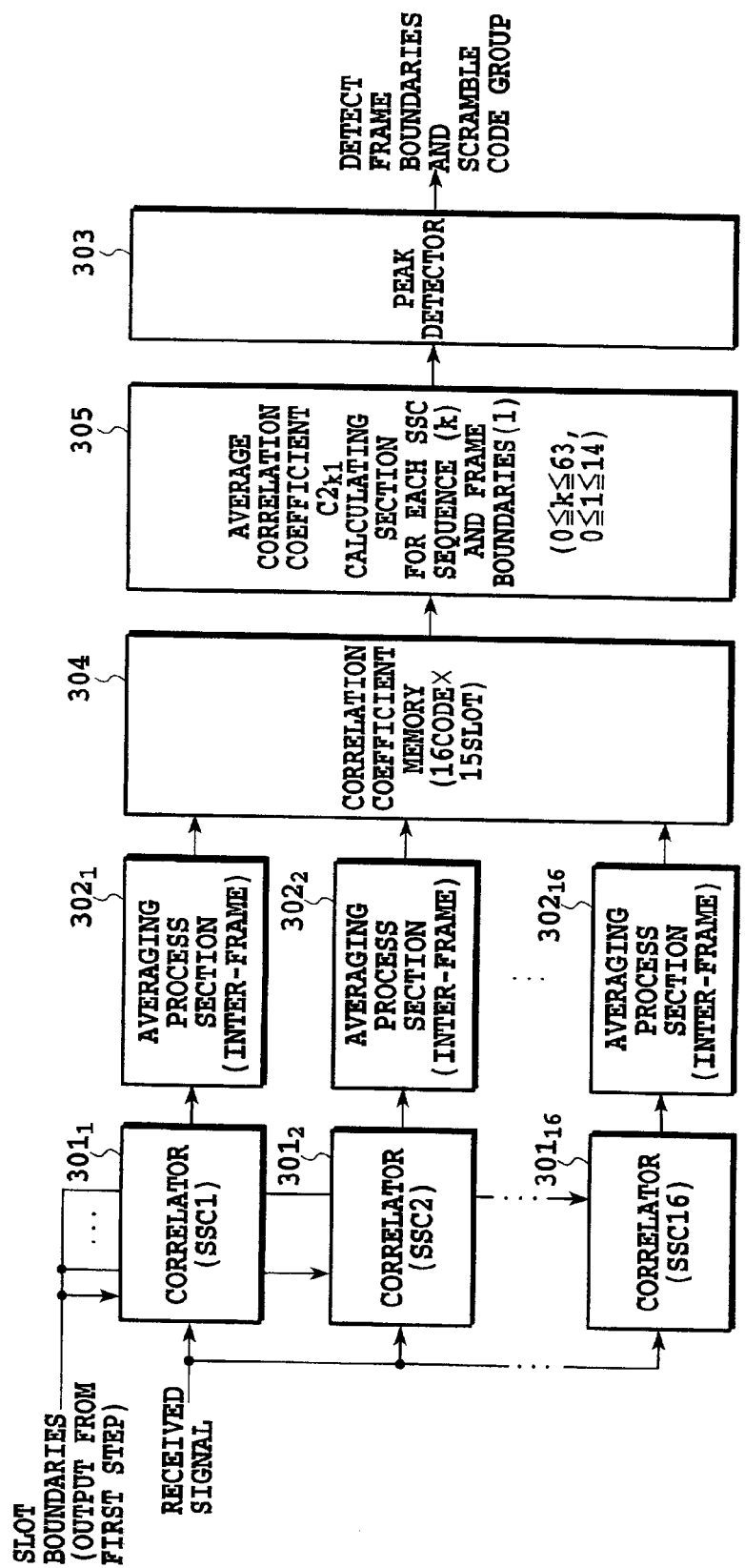
FIG. 3 is a diagram for use in describing an operation at a second step of the conventional cell search method.
Figure 4:
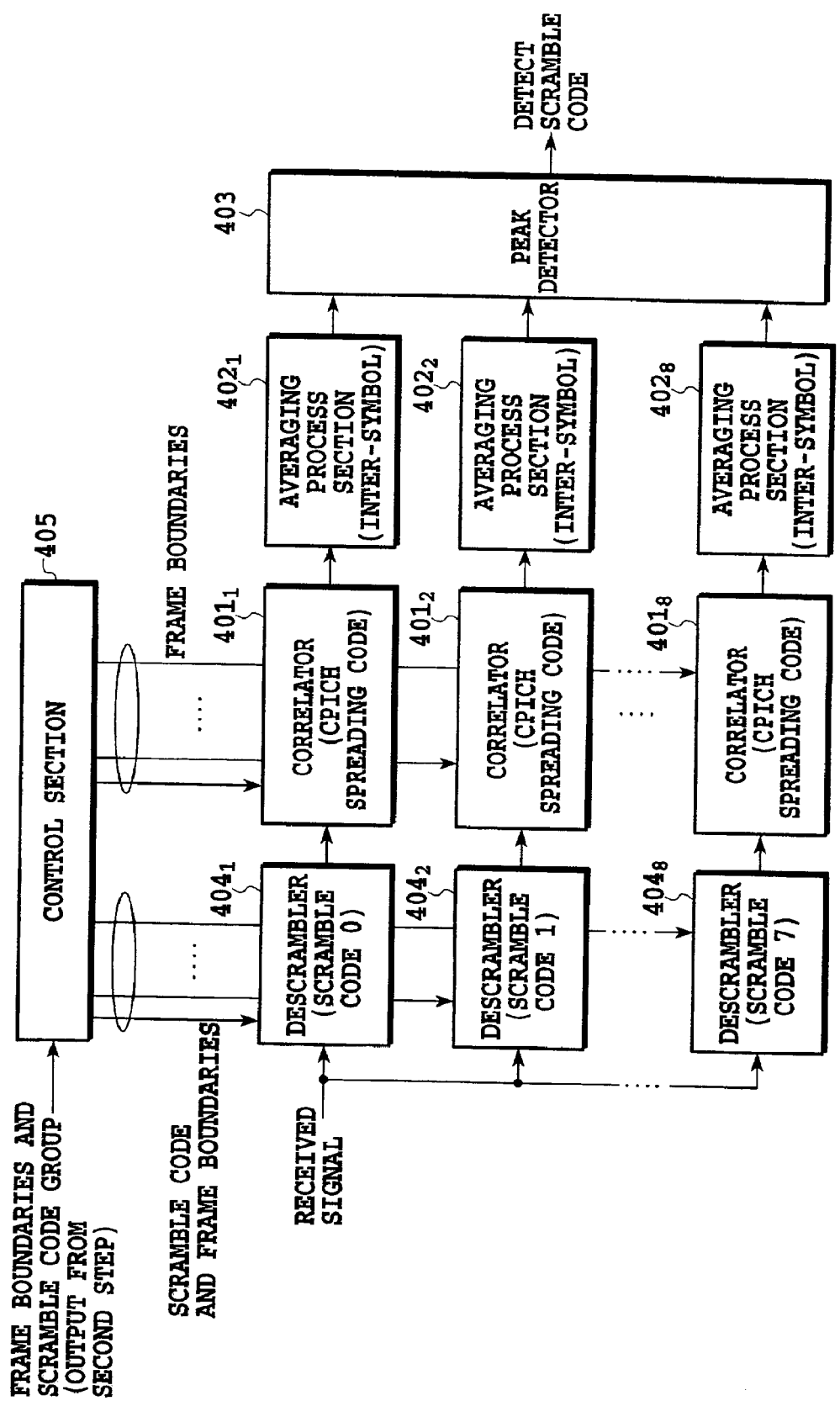
FIG. 4 is a diagram for use in describing an operation at a third step of the conventional cell search method.
Figure 5:
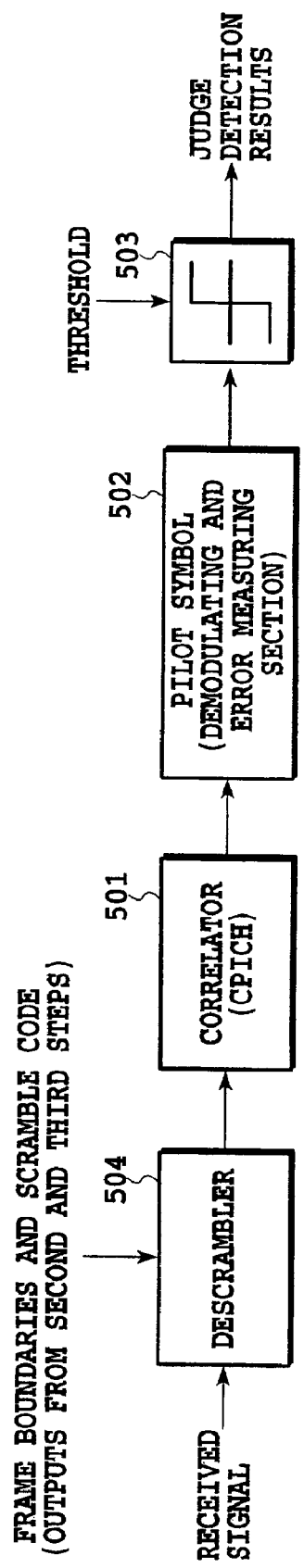
FIG. 5 is a diagram for use in describing a conventional method of judging detected frames and scramble code.
Figure 6:
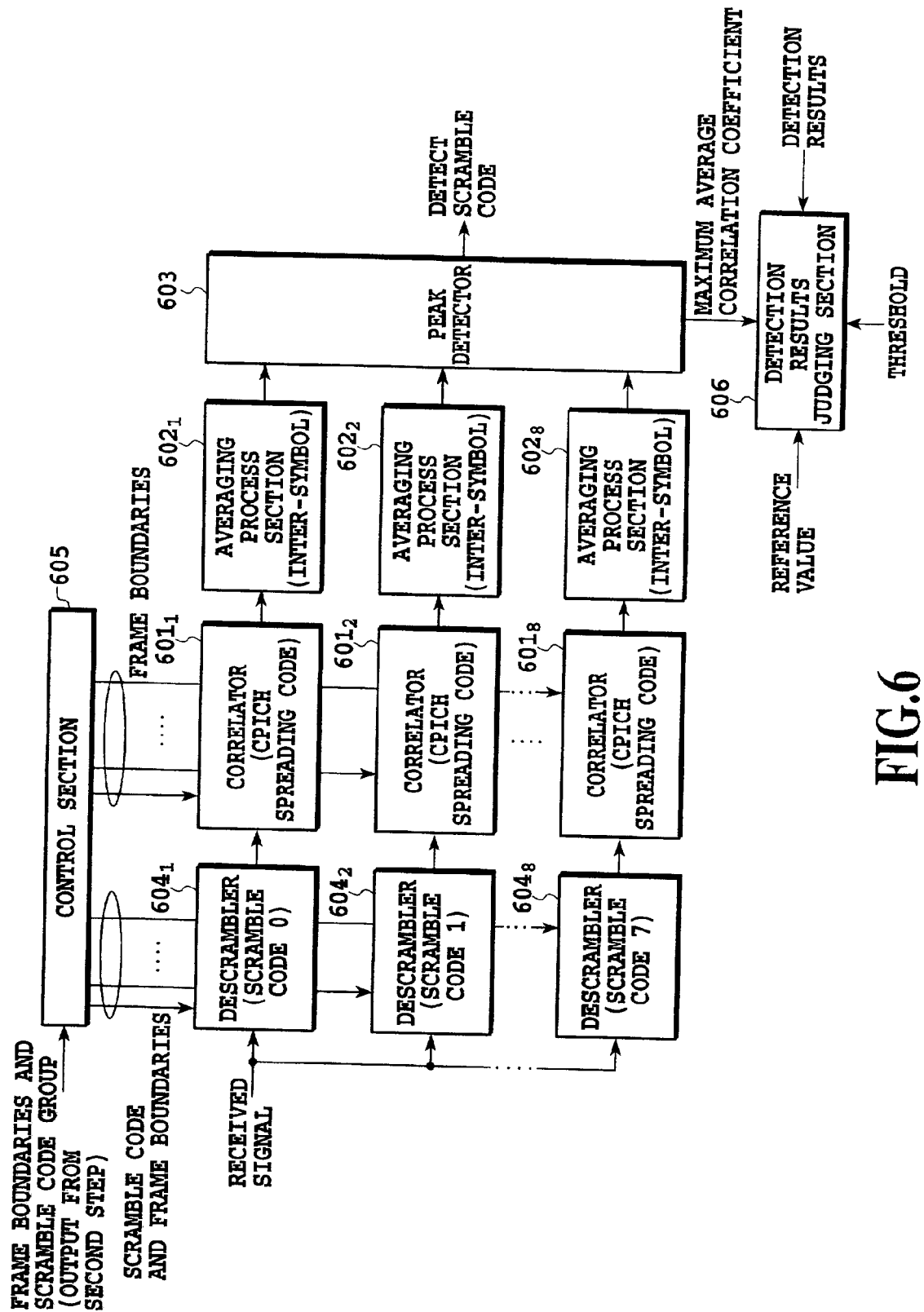
FIG. 6 is a diagram showing a detection results judging method executed after a three-step cell search according to an embodiment of the present invention.

FIG. 6 shows a detection results judging method executed after a three-step cell search according to an embodiment of the present invention. With this method, detection results are judged simultaneously with an operation at a third step of the third-step cell search method. A mobile station calculates the phases of scramble codes on the basis of frame boundaries detected during a first and a second steps, and causes descrambler $604_1$ to $604_8$ to descramble the received signal with eight scramble codes. Then, correlators $601_1$ to $601_8$ despread calculates the phases of the scramble codes on the basis of the frame boundaries detected at the second step, and despread the signal with the spreading code for the common pilot channel. The mobile station performs this operation over a plurality of symbols, and causes averaging process sections $602_1$ to $602_8$ to average the results. A peak detector 603 then selects a scramble code corresponding to the largest average correlation coefficient to detect it as the down scramble code used by the base station.

The mobile station outputs this largest average correlation coefficient to a detection results judging section 606 to calculate the ratio of this value to a reference value calculated inside itself to determine that the detection results are correct if the ratio is equal to or larger than a threshold. Otherwise, the mobile station executes the cell search again or determines that it is out of the service area of this base station. With this method, the detection results can be judged simultaneously with the operation at the third step, thereby reducing the time required for the cell search and the judgement of the detection results. Further, the use of proper reference value and threshold enables the detection results to be accurately judged. The judgement accuracy achieved by the detection results judging method of this embodiment will be described later.

Several reference values can be used to judge the detection results. For example, interference power calculated by the mobile station can be used as a reference value. To achieve this method, it is contemplated that a circuit for measuring the interference power may be provided separately from a cell search circuit. Since the mobile station based on the W-CDMA method has a function of measuring down interference power, this function can be used to calculate the interference power (refer to 3GPP Technical Specification TS25.215). Specifically, the interference power can be calculated by, for example, receiving a pilot signal through a common pilot channel and measuring the variance of an average value for this signal.

Figure 7:
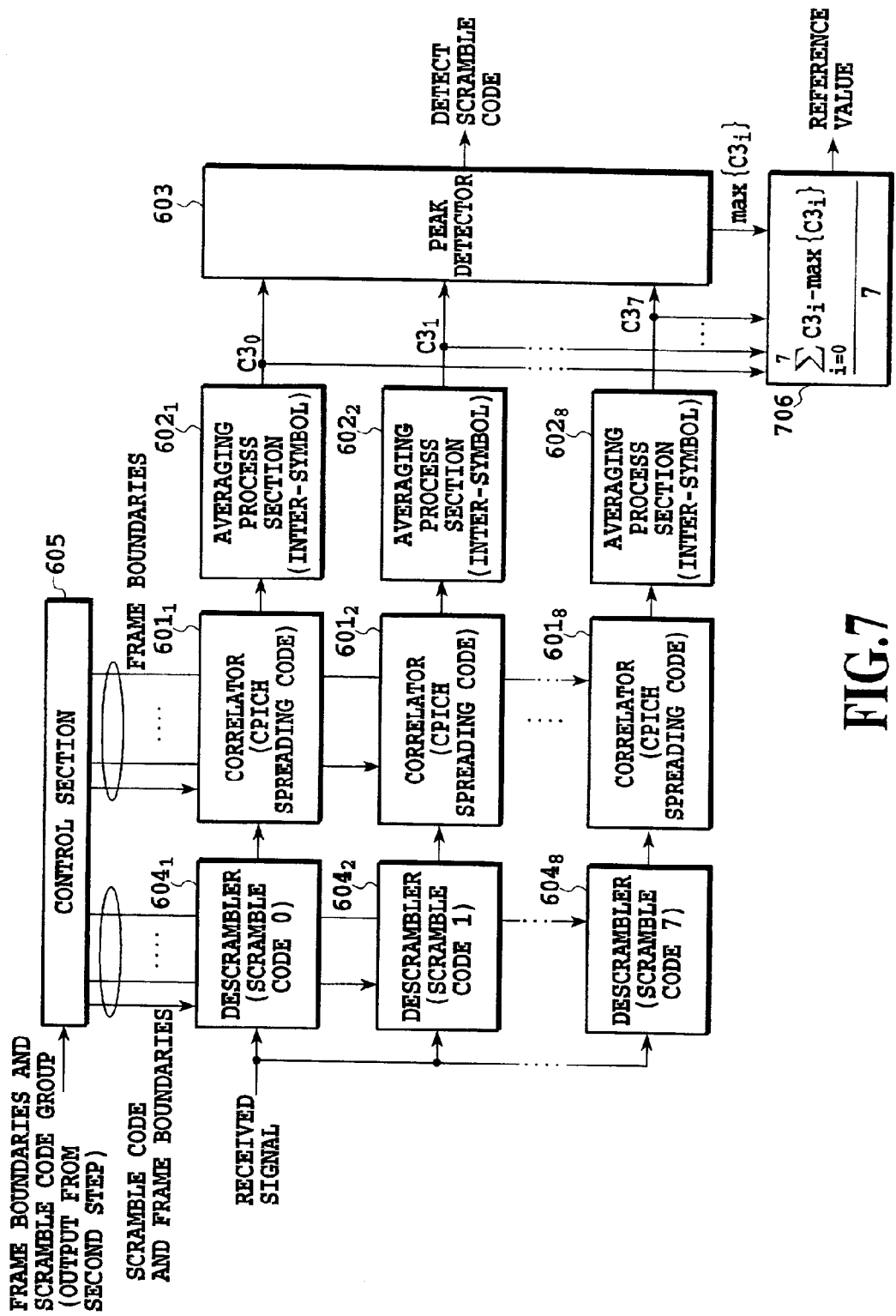
FIG. 7 is a diagram showing a detection results judging method of calculating a reference value at a third step according to an embodiment of the present invention.

FIG. 7 shows a detection results judging method of calculating the reference value at the third step according to one embodiment of the present invention. The method of detecting a scramble code at the third step is the same as that described in FIG. 6. A reference value calculating section 706 calculates, as the reference value, the average or median of average correlation coefficients ($C3_0$ to $C3_7$) for scramble codes calculated at the third step, except the largest one thereof ($\max\{C3_1\}$). For example, in the W-CDMA method, one scramble code group contains eight scramble codes. The mobile station calculates the phases of scramble codes on the basis of the frame boundaries detected during the first and second steps, descrambles the received signal with eight scramble codes, and then despreads the signal with a spreading code for the common pilot channel. The mobile station performs this operation over a plurality of symbols, and averages the results to calculate the average correlation coefficients ($C3_0$ to $C3_7$) for the scramble codes. On the other hand, a reference value calculating section 706 determines the average or median of the seven average correlation values excluding the largest one, and uses it as a reference value for judging the detection results. This average or median corresponds to the interference power. This method eliminates the need to separately measure the interference power as described above, and enables the interference power-equivalent value to be calculated substantially simultaneously with the calculation of the maximum average correlation coefficient. Consequently, this method is unlikely to be subjected to the adverse effects of the temporal variation of the interference power.

Figure 8:
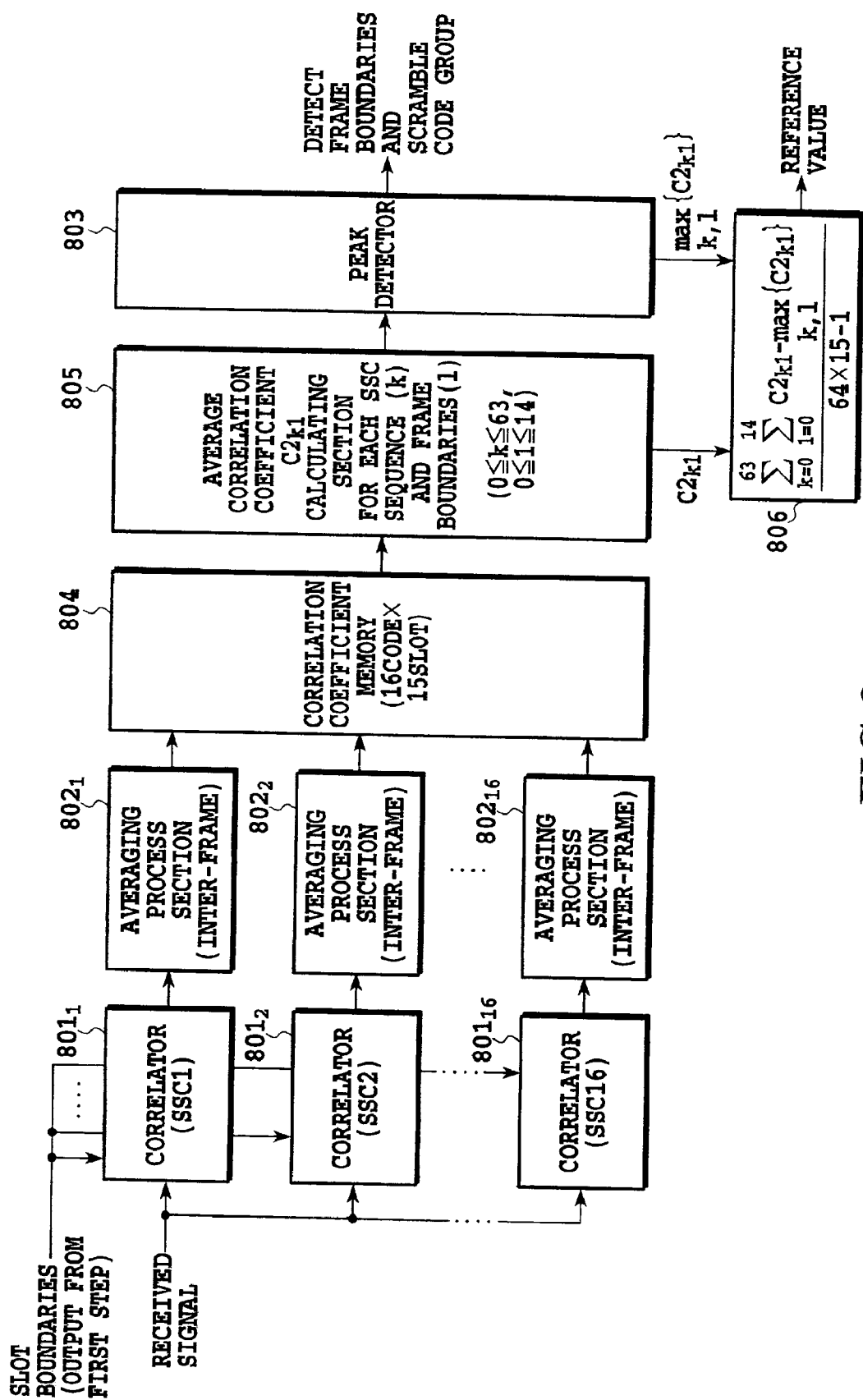
FIG. 8 is a diagram showing a detection results judging method of calculating the reference value at a second step according an embodiment of the present invention.

FIG. 8 shows a detection results judging method of calculating the reference value at the second step according to one embodiment of the present invention. A timing with which transmissions are executed on a secondary synchronization channel are calculated on the basis of slot boundaries detected at the first step. Correlators $801_1$ to $801_{16}$ corresponding to secondary synchronization codes detect a correlation using the calculated timing. This operation is performed over a plurality of slots. Since a secondary synchronization code pattern is repeated on the secondary synchronization channel so as to correspond to the frame cycles, averaging process sections $802_1$ to $802_{16}$ execute an averaging process over the frames as required. After the inter-frame averaging, a maximum of 16×15 average correlation coefficients are output and stored in a correlation value memory 804. Subsequently, a $C2_{k1}$ calculating section 805 averages the correlation coefficients so as to correspond to timings and SSC spreading code sequences that are possible within the frame. A maximum of 15×64 average correlation coefficients are calculated. Then, a peak detector 803 detects frame boundaries and a scramble code group by selecting a timing and an SSC spreading code sequence with which the average correlation coefficient is largest, thereby detecting frame boundaries and a scramble code group.

Furthermore, this method uses, as a reference value, the average or median of the average correlation coefficients ($C2_{k1}$) for the SSCH spreading code sequence corresponding to the frame boundaries and scramble code group calculated at the second step, except the largest one thereof ($\max\{C2_{k1}\}$). For example, in the W-CDMA method, the slot boundaries are detected during the first step, so that at the second step, the number of candidate timings for the frame boundaries is limited to 15, that is, the number of slots within one frame. Further, since there are 64 secondary synchronization channel sequences, a maximum of 15×64= 960 average correlation coefficients ($C2_{k1}$) are calculated. Frame boundaries and a scramble code group providing the maximum average correlation coefficient ($\max\{C2_{k1}\}$) are selected. On the other hand, a reference value calculating section 806 determines the average or median of 959 average correlation values excluding the maximum average correlation coefficient, and uses it as a reference value.

If information on frame boundaries or scramble code groups for surrounding cells has been obtained from control information from the base station, then not all the average correlation coefficients may be found. In this case, however, only all the average correlation coefficients calculated are used. This value corresponds to interference power. If information on scramble code groups for surrounding cells has been obtained, for example, from control information from the base station, then the average correlation coefficient may be found for only one scramble code at the third step. In this case, the reference value cannot be calculated at the third step using the above described method, so that this method, which determines the reference value at the second step, is effective.

Figure 9:
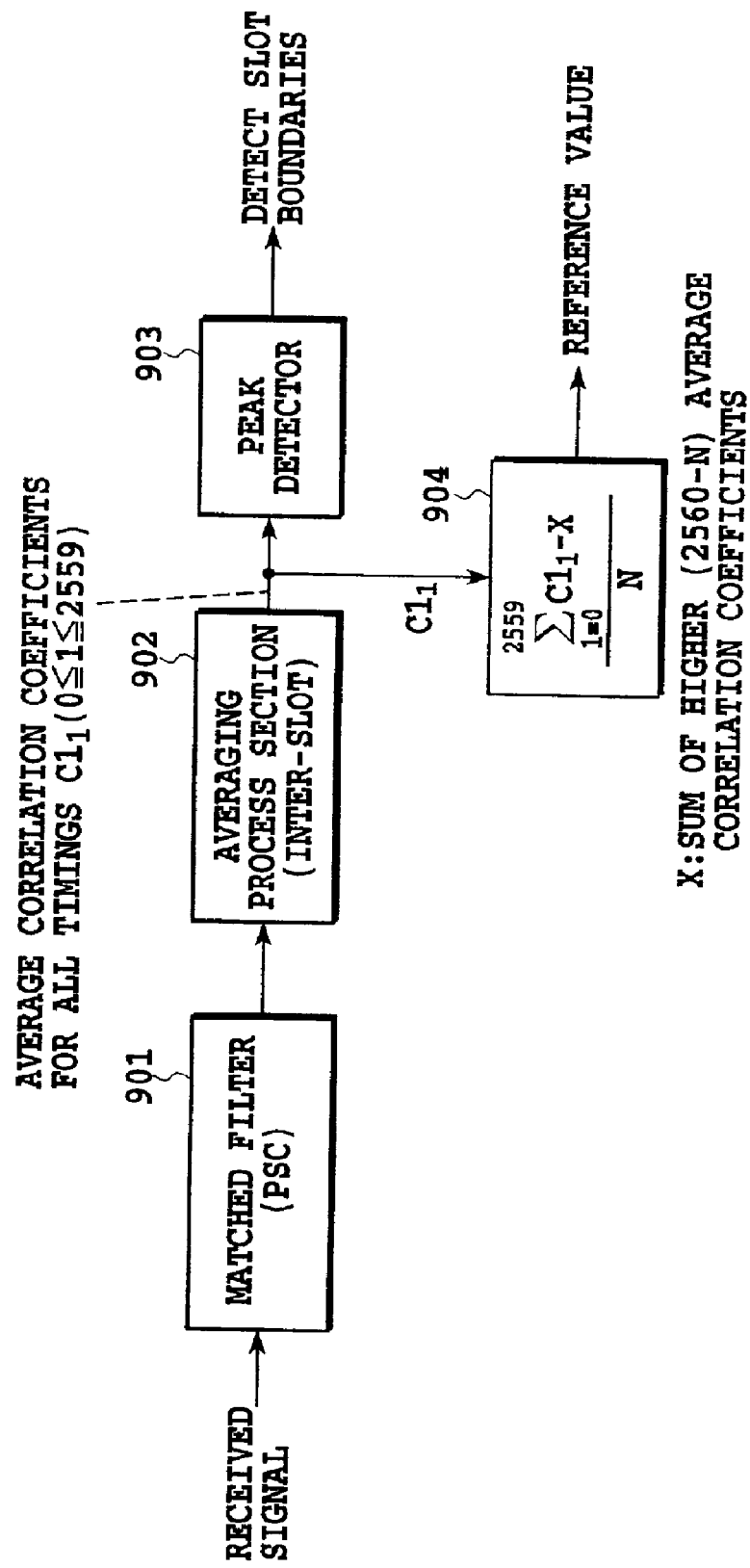
FIG. 9 is a diagram showing a detection results judging method of calculating the reference value at a first step according to an embodiment of the present invention.

FIG. 9 shows a detection results judging method of calculating the reference value at the first step according to one embodiment of the present invention. The mobile station inputs the received signal to a matched filter 901 corresponding to this spreading code PSC, and causes an multi-slot averaging process section 902 to execute averaging over a plurality of slots in order to reduce the adverse effects of noise and interference. A peak detector 903 selects a timing with which an average correlation coefficient is largest, to detect slot boundaries. In the W-CDMA method, one slot corresponds to 2,560 chips, so that there are 2,560 candidate timings for the slot boundaries if no oversampling is executed.

Another method uses, as a reference value, the average or median of lower N ($C1_1$-X) of the average correlation values ($C1_1$) for the timings calculated at the first step. For example, in the W-CDMA method, if the sampling period of the mobile station equals one chip, there are 2,560 candidate timings for the slot boundaries; this number is equal to that of chips per slot. The average correlation coefficient is calculated for each of the candidate timings. Then, frame boundaries are detected on the basis of a timing providing the maximum average correlation coefficient. On the other hand, a reference value calculating section 904 finds the average or median of N smaller ones ($C1_1$-X) of 2,560 average correlation coefficients ($C1_1$) and uses it as a reference value for judging the detection results. The N smaller average correlation coefficients are used in order to reduce the adverse effects of a plurality of multipaths for the cell and a plurality of peaks of multipaths for surrounding cells all of which are visible because at the first step, the signal is received through a primary synchronization channel, which uses a spreading code that is common to all cells and slots.

With this method, the calculated reference value is equivalent to the interference power. For example, if information on frame boundaries or scramble codes for surrounding cells has been obtained from control information or the like from the base station, the second step may be skipped or the average correlation coefficient may be calculated for only one scramble code at the third step. In this case, the reference value cannot be calculated at the second or third step, so that this method, which determines the reference value at the first step is effective. Further, this method has the advantage of obtaining a stable reference value because a large number of samples are obtained.

Figure 10:
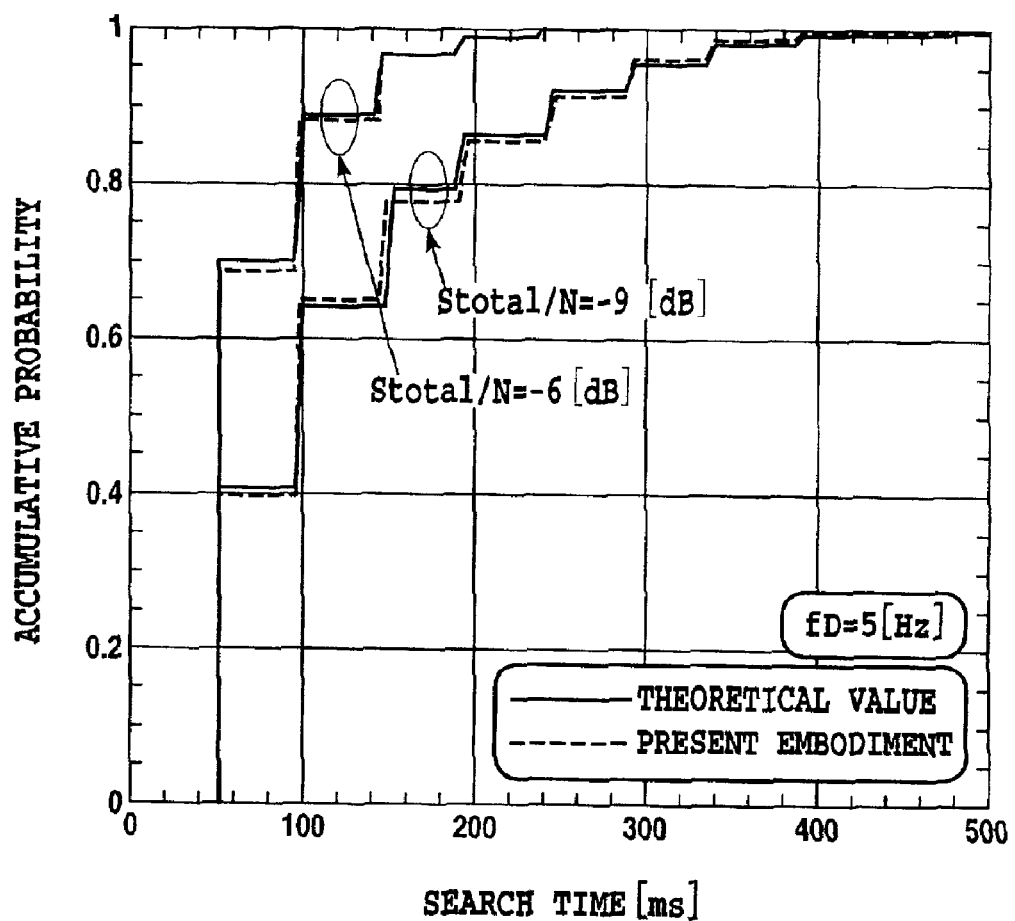
FIG. 10 is a graph showing search time characteristics based on the detection results judging method according to an embodiment of the present invention.

FIG. 10 shows search time characteristics based on the detection results judging method according to an embodiment of the present invention. This figure shows an example of the results of the simulation of cell search temporal characteristics using the detection results judging method executed after the three-step cell search. The axis of abscissas indicates search time, and the axis of ordinates indicates the accumulative probability of the correct search by the mobile station in a certain time. Fading has a maximum Doppler frequency (fD) of 5 Hz, and Stotal/N in the graph denotes the ratio of the total power of a received signal from the base station to the sum of interference power and noise power. The solid line denotes the case where it is assumed that the detection results have been ideally judged without any errors, and the broken line denotes the case where in accordance with this embodiment, the average of the average correlation coefficients except the largest one thereof is calculated as a reference and where the ratio of the maximum average correlation coefficient to the reference value is used to judge the detection results. The threshold is set at 4 dB. This figure shows that the detection results judging method of this embodiment is so accurate that the detection results can be substantially ideally judged.

In the above embodiments, the three-step cell search is executed, but this cell search may be omitted. This omission occurs if, for example, accurate information on scramble codes and frame boundaries for surrounding cells can be obtained from the base station, or the cell search has already been carried out, so that scramble codes or rough frame boundaries for the surrounding cells have been known.

Figure 11:
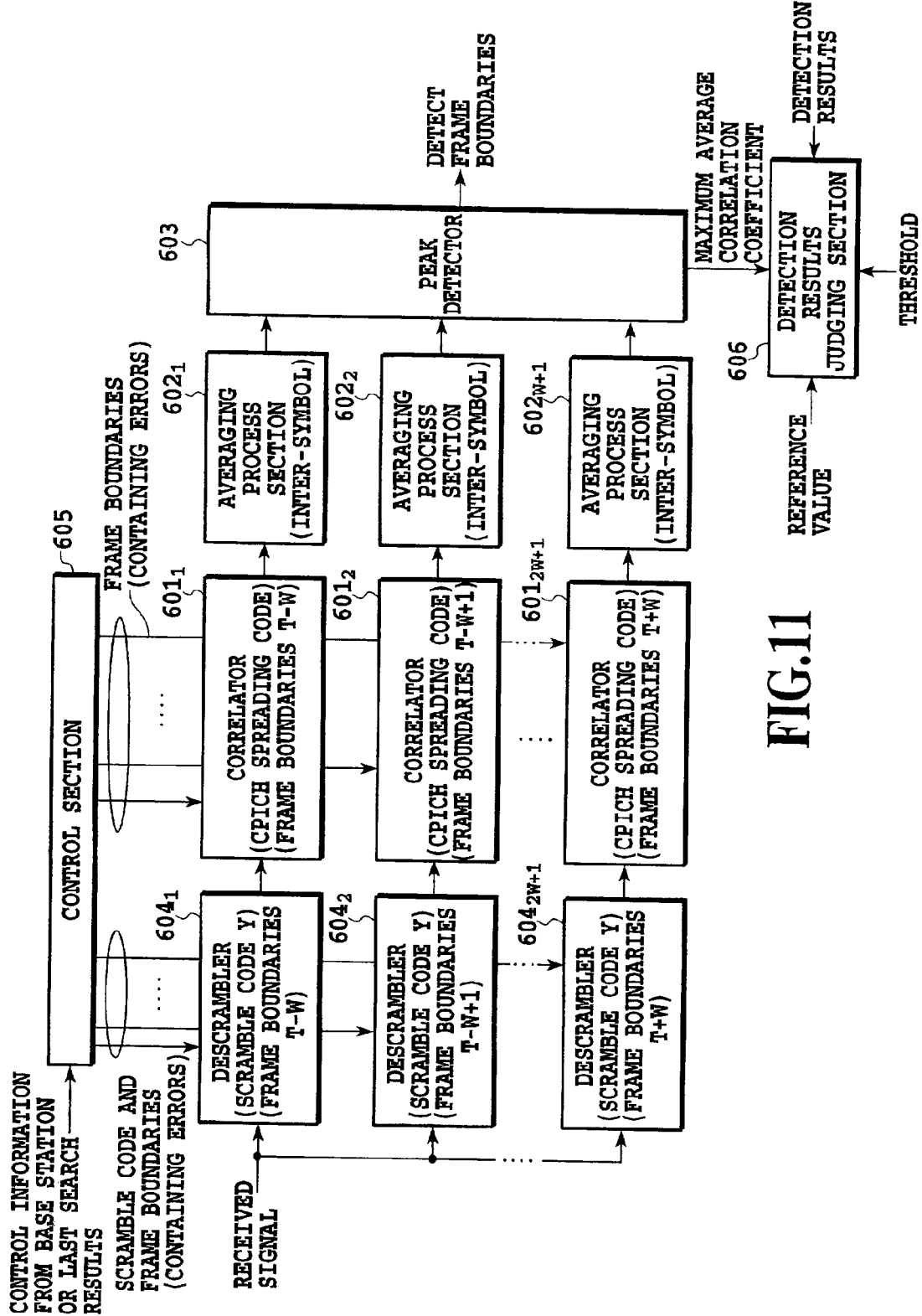
FIG. 11 is a diagram showing a detection results judging method that does not use the three-step cell search method according to an embodiment of the present invention.

FIG. 11 is a diagram showing a detection results judging method that does not use the three-step cell search method according to an embodiment of the present invention. This method is applicable if accurate information on scramble codes and frame boundaries for surrounding cells can be obtained from the base station, or the cell search has already been carried out, so that scramble codes or rough frame boundaries for the surrounding cells have been known. A control section 605 provides descramblers $604_1$ to $604_{2W+1}$ with control information from the base station or the scramble code obtained from the last search results. The descramblers $604_1$ to $604_{2W+1}$ descramble the received signal with this scramble code. Correlators $601_1$ to $601_{2W+1}$ calculates an average correlation coefficient over an expected timing T±W including a plurality of phases, on the basis of the rough frame boundaries. This operation is performed over a plurality of symbols, and an averaging process section $602_1$ to $602_{2W+1}$ averages the results. Then, a peak detector 603 selects a phase providing the maximum average correlation coefficient, thereby detecting frame boundaries.

On the other hand, a detection results judging section 606 determines the ratio of this maximum average correlation coefficient and the reference value calculated inside the mobile station, and compares this ratio with the threshold to judge the detection results. An example of the reference value includes the interference power calculated by the mobile station, as in the case where the three-step cell search is executed.

Figure 12:
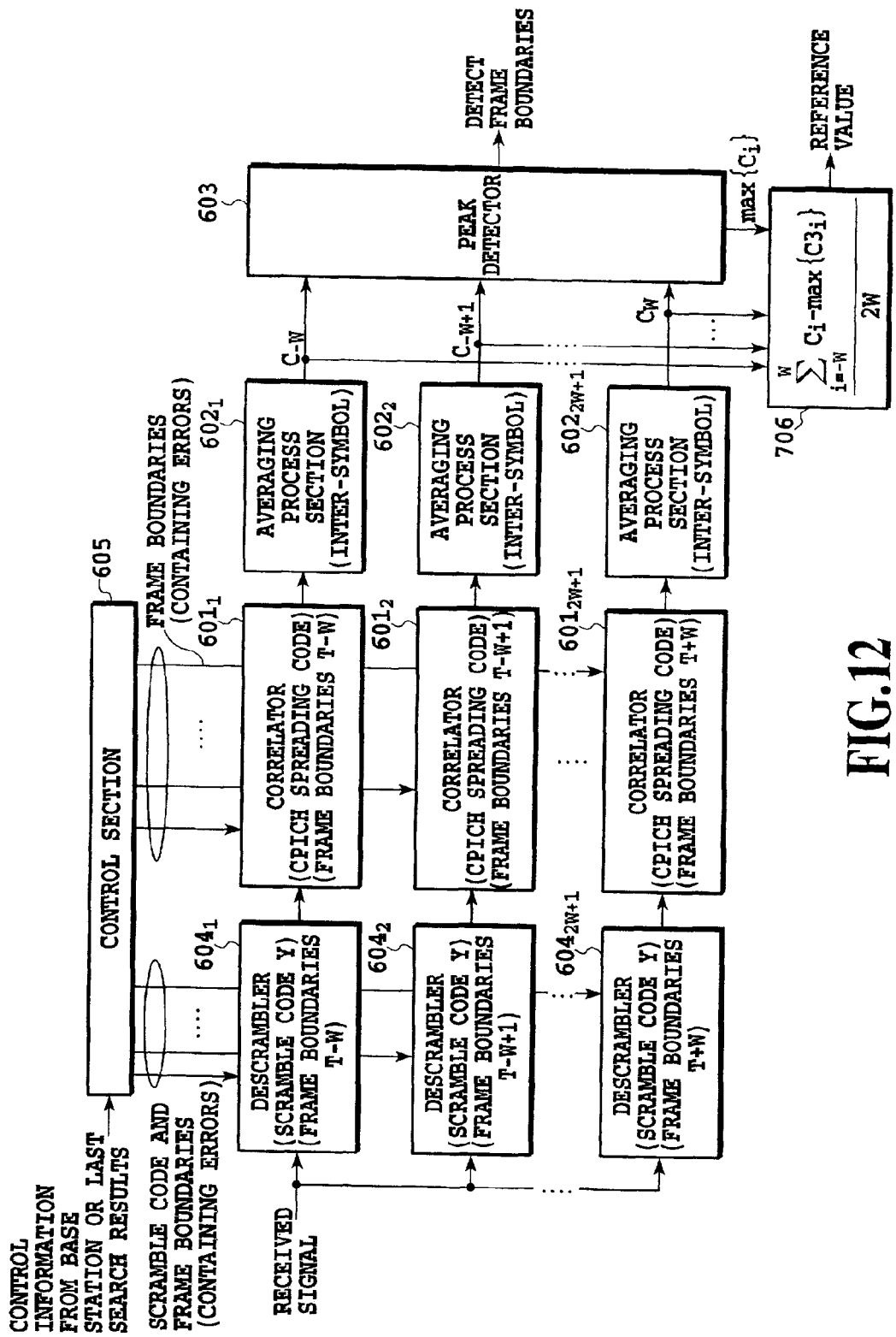
FIG. 12 is a diagram showing detection results judging method of calculating the reference value independently of the three-step cell search method according to an embodiment of the present invention.

FIG. 12 is a diagram showing detection results judging method of calculating the reference value independently of the three-step cell search method according to an embodiment of the present invention. This method is applicable if accurate information on scramble codes and frame boundaries for surrounding cells can be obtained from the base station, or the cell search has already been carried out, so that scramble codes or rough frame boundaries for the surrounding cells are been known. The method of detecting frame boundaries is the same as that described in FIG. 11. A reference value calculating section 706 calculates, as a reference value, the average or median of average correlation coefficients ($C_{-W}$ to $C_W$) corresponding to the plurality of phases calculated, except the largest one thereof ($\max\{C_i\}$).

As described above, according to this embodiment, if the three-step cell search is executed, it is unnecessary to despread the received signal in order to judge the detection results again after the three steps have been completed, thereby enabling the detection results to be judged within a short search time.

Further, the reference value equivalent to the interference power is calculated substantially simultaneously with the calculation of the maximum average correlation coefficient at the third step, thereby enabling the detection results to be reliably judged without being affected by the temporal variation of the interference power.

Furthermore, if the reference value cannot be calculated at the third step, this calculation can be executed at the second step. If the reference value cannot be calculated at the second or third step, this calculation can be executed at the first step.

Moreover, even if the three-step cell search is not executed, it is unnecessary to despread the received signal in order to judge the detection results, thereby enabling the detection results to be judged within a short search time.

Further, the reference value equivalent to the interference power is calculated substantially simultaneously with the search, thereby enabling the detection results to be reliably judged without being affected by the temporal variation of the interference power.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A cell search method for a mobile station in a mobile communication system, the method comprising a first step of despreading a received signal using a common spreading code common to all slots and detecting slot boundaries on the basis of a first average correlation coefficient, a second step of despreading the signal on the basis of said slot boundaries detected at the first step, using different individual spreading codes for said respective slots, and detecting frame boundaries and a scramble code group on the basis of a second average correlation coefficient, and a third step of descrambling a common pilot signal on the basis of said frame boundaries and scramble code group detected at the second step, and detecting a scramble code on the basis of a third average correlation coefficient, the method being characterized in that:

the average or median of the average correlation values excluding the largest one is calculated, said average or median being a reference value corresponding to an interference power, the detection results for said frame boundaries and scramble code are judged on the basis of a ratio of the largest one of a plurality of said average correlation coefficients to said interference power.

2. The cell search method for a mobile station in a mobile communication system according to claim 1, characterized in that said reference value is set on the basis of a plurality of third average correlation coefficients except the largest one thereof.

3. The cell search method for a mobile station in a mobile communication system according to claim 1, characterized in that said reference value is set on the basis of a plurality of said second average correlation coefficients except the largest one thereof.

4. The cell search method for a mobile station in a mobile communication system according to claim 1, characterized in that said reference value can be set on the basis of a plurality of said first average correlation coefficients.

5. A cell search method for a mobile station in a mobile communication system, the method descrambling a common pilot signal on the basis of information on known scramble codes and frame boundaries, and detecting a scramble code on the basis of an average correlation coefficient, the method being characterized in that:

the detection results for said frame boundaries and scramble codes are judged on the basis of a ratio of the largest one of a plurality of said average correlation coefficients to a predetermined reference value, said predetermined reference value being an average or a median of a plurality of said average correlation coefficients except the largest one thereof.

6. A cell search apparatus for a mobile station in a mobile communication system, the apparatus comprising a first detector for despreading a received signal using a common spreading code common to all slots and detecting slot boundaries on the basis of a first average correlation coefficient, a second detector for despreading the signal on the basis of said slot boundaries detected at the first step, using different individual spreading codes for said respective slots, and detecting frame boundaries and a scramble code group on the basis of a second average correlation coefficient, and a third detector for descrambling a common pilot signal on the basis of said frame boundaries and scramble code group detected at the second step, and detecting a scramble code on the basis of a third average correlation coefficient, the apparatus being characterized by comprising:

judgment means for calculating the average or median of the average correlation values excluding the largest one, said average or median being a reference value corresponding to an interference power, and for judging the detection results for said frame boundaries and scramble code on the basis of a ratio of the largest one of a plurality of said average correlation coefficients to said interference power.

7. The cell search apparatus for a mobile station in a mobile communication system according to claim 6, characterized in that said reference value is set on the basis of a plurality of third average correlation coefficients except the largest one thereof.

8. The cell search apparatus for a mobile station in a mobile communication system according to claim 6, characterized in that said reference value is set on the basis of a plurality of said second average correlation coefficients except the largest one thereof.

9. The cell search apparatus for a mobile station in a mobile communication system according to claim 6, characterized in that said reference value can be set on the basis of a plurality of said first average correlation coefficients.

10. A cell search apparatus for a mobile station in a mobile communication system, the apparatus descrambling a common pilot signal on the basis of information on known scramble codes and frame boundaries, and detecting a scramble code on the basis of an average correlation coefficient, the method being characterized by comprising:

judgment means for judging detection results for said frame boundaries and scramble codes on the basis of a ratio of the largest one of a plurality of said average correlation coefficients to a predetermined reference value, said predetermined reference value being an average or a median of a plurality of said average correlation coefficients except the largest one thereof.

* * * * *